US007707710B2

(12) United States Patent
Lape et al.

(10) Patent No.: US 7,707,710 B2

(45) Date of Patent: May 4, 2010

(54) TOOL FOR DRIVING WEDGES OR SLIDES

(75) Inventors: Brock M. Lape, Clifton Park, NY (US); Michael J. Bousquet, Hewitt, NJ (US); Kenneth J. Hatley, Madison, NJ (US); Richard M. Hatley, Convent Station, NJ (US); William G. Newman, Scotia, NY (US); Kenneth G. Troiano, Alpharetta, GA (US)

(73) Assignee: General Electric Company, Schenectady, NY (US)

( * ) Notice: Subject to any disclaimer, the term of this patent is extended or adjusted under 35 U.S.C. 154(b) by 318 days.

(21) Appl. No.: 11/881,973

(22) Filed: Jul. 31, 2007

(65) Prior Publication Data

US 2009/0031556 A1 Feb. 5, 2009

(51) Int. Cl.
*H02K 15/00* (2006.01)

(52) U.S. Cl. .......................... 29/732; 29/564.5; 81/3.2; 81/9.51; 81/52; 81/57.11; 81/333; 173/48; 173/117; 173/148; 173/194; 173/196; 242/431; 242/444

(58) Field of Classification Search .................. 29/732, 29/564.5; 173/194, 196, 48, 117, 148; 81/3.2, 81/9.51, 333, 52, 472, 476, 453, 57.11, 444; 242/431–439

See application file for complete search history.

(56) References Cited

U.S. PATENT DOCUMENTS 2,485,992 A * 10/1949 Terry .......................... 29/764
2,599,818 A * 6/1952 Evans .......................... 29/732
3,393,335 A 7/1968 Butman, Jr. et al.
3,665,576 A * 5/1972 Nordmann et al. ............ 29/729
4,584,497 A 4/1986 Butman, Jr. et al.
6,218,759 B1 4/2001 Blakelock et al.
6,421,914 B1 7/2002 Iversen et al.
6,584,680 B2 7/2003 Iversen et al.
6,708,395 B2 * 3/2004 Pezzano et al. ............... 29/732
2005/0058890 A1 * 3/2005 Brazell et al. ................. 429/99
2009/0031557 A1 2/2009 Lape et al.

* cited by examiner

*Primary Examiner*—Derris H Banks
*Assistant Examiner*—Azm Parvez
(74) *Attorney, Agent, or Firm*—James W. Pemrick; Ernest G. Cusick; Frank A. Landgraff

(57) ABSTRACT

A tool is disclosed for driving a slide under a wedge within a slot of an armature or field of a dynamoelectric machine. The tool comprises a frame including a pair of elongated rail members; a force application block located between the rail members; a drive connected to the frame, substantially intermediate opposite ends of the frame; a lead screw threadably engaged at one end with the force application block and connected at an opposite end to the drive such that the drive rotates the lead screw when actuated. Rotation of the lead screw causes axial movement of the force application block. The armature or field includes a core, and this core may have one or more vent slots for facilitating ventilation of the armature or field. A slot plate for locating the tool relative to the slide is present, and a portion of the slot plate extends into one or more vent slots. The slot plate establishes a reaction point for forces applied by the force application block to the stator slide.

15 Claims, 7 Drawing Sheets

TOOL FOR DRIVING WEDGES OR SLIDES

BACKGROUND OF THE INVENTION

This invention relates to dynamoelectric machines and, in particular, to a tool for installing a stator slide under a stator wedge in the stator core of a generator.

Dynamoelectric machines, such as generators, typically employ a stator or armature core comprised of stacked laminations of magnetic material forming a generally annular assembly. An array of axially extending circumferentially spaced stator core slots are formed through the radial inner surface of the annular assembly. Armature or stator windings are disposed in these slots. A rotor or field is coaxially arranged within the stator core and contains field windings typically excited from an external source to produce a magnetic field rotating at the same speed as the rotor. With the foregoing arrangement, it will be appreciated that electrical output is generated from the armature windings.

Stator or armature windings are seated within the stator core slots and are held in place by a slot support system that includes stator wedges, stator slides, filler strips and ripple springs. These support components are employed in order to maintain the stator armature windings in a radially tight condition within the slots. The armature windings of generators operate under continuous strain of electromagnetic forces that must be completely contained to prevent high voltage armature winding insulation damage. Insulation damage can also be exacerbated by relative movement between the armature windings and stator core. The wedges, slides, filler strips and ripple springs impose radial forces on the armature windings and aid the windings in resisting magnetic and electrically induced radial forces.

The stator wedges are received within axial dovetail slots on opposite sidewalls of the radial slots. During the process of tightening the stator wedges, it is necessary to install a stator slide against each stator wedge. For the sake of convenience, reference will be made herein to "stator wedges" that are seated in the dovetail slots and "stator slides" that are used to tighten the wedges. The stator slide can be, but is not necessarily, pre-gauged and pre-sized to have a significant interference fit relative to the slot contents, i.e., the windings, fillers and ripple springs. The force required to install the stator slide may be thousands of pounds.

Several methods have been used to provide the force required to install the stator slides. For example, stator slides have been manually installed using a drive board and a large hammer, or by using a modified pneumatically operated hammer. These methods, however, are time consuming and place considerable strain on the operator. They also subject the operator to fatigue, the risk of repetitive motion injury and/or hearing damage, and pose a risk to the integrity of the stator core and armature windings. The hammering technique can also cause snapped stator slides, which result from off-center hits, or an operator can inadvertently miss the slide and hit the stator core, resulting in damage to the core and a lengthy and time-consuming process to fix the damaged core portions. The uniformity and consistency of the stator wedge and stator slide tightness is also poor using the above-described methods.

Accordingly, a need exists in the art for a device that can be used to drive stator slides that minimizes operator fatigue and injury, minimizes stator core damage, minimizes installation time, and maximizes uniformity and consistency of stator wedge and stator slide tightness.

BRIEF DESCRIPTION OF THE INVENTION

This invention provides a new stator slide driver device that enables a smooth, controlled, non-impacting stator slide assembly technique, with significant reduction or elimination of the aforementioned risks.

A tool is disclosed for driving a slide under a wedge within a slot of an armature or field of a dynamoelectric machine. The tool comprises a frame including a pair of elongated rail members; a force application block located between the rail members; a drive connected to the frame, substantially intermediate opposite ends of the frame; a lead screw threadably engaged at one end with the force application block and connected at an opposite end to the drive such that the drive rotates the lead screw when actuated. Rotation of the lead screw causes axial movement of the force application block. The armature or field includes a core, and this core may have one or more vent slots for facilitating ventilation of the armature or field. A slot plate for locating the tool relative to the slide is present, and a portion of the slot plate extends into one or more vent slots. The slot plate establishes a reaction point for forces applied by the force application block to the stator slide.

A tool is disclosed for driving a slide between a wedge and armature winding in a dynamoelectric machine. The dynamoelectric machine includes an armature core and a plurality of armature winding slots. The armature core includes one or more vent slots for facilitating ventilation of the armature core. The tool comprises a frame including a pair of elongated rail members, the frame having opposing frame ends disposed near the ends of the elongated rail members; force application means located generally between the elongated rail members, the force application means comprising a wedge driving member, the wedge driving member making contact with the slide, the force application means and the wedge driving member for applying force to the slide to drive the slide between the wedge and the armature winding; a vent slot plate located near one of the opposing frame ends, a portion of the vent slot plate extending into the one or more vent slots, and for establishing a reaction point for forces applied by the force application means to the slide.

DETAILED DESCRIPTION OF THE INVENTION

Figure 1:
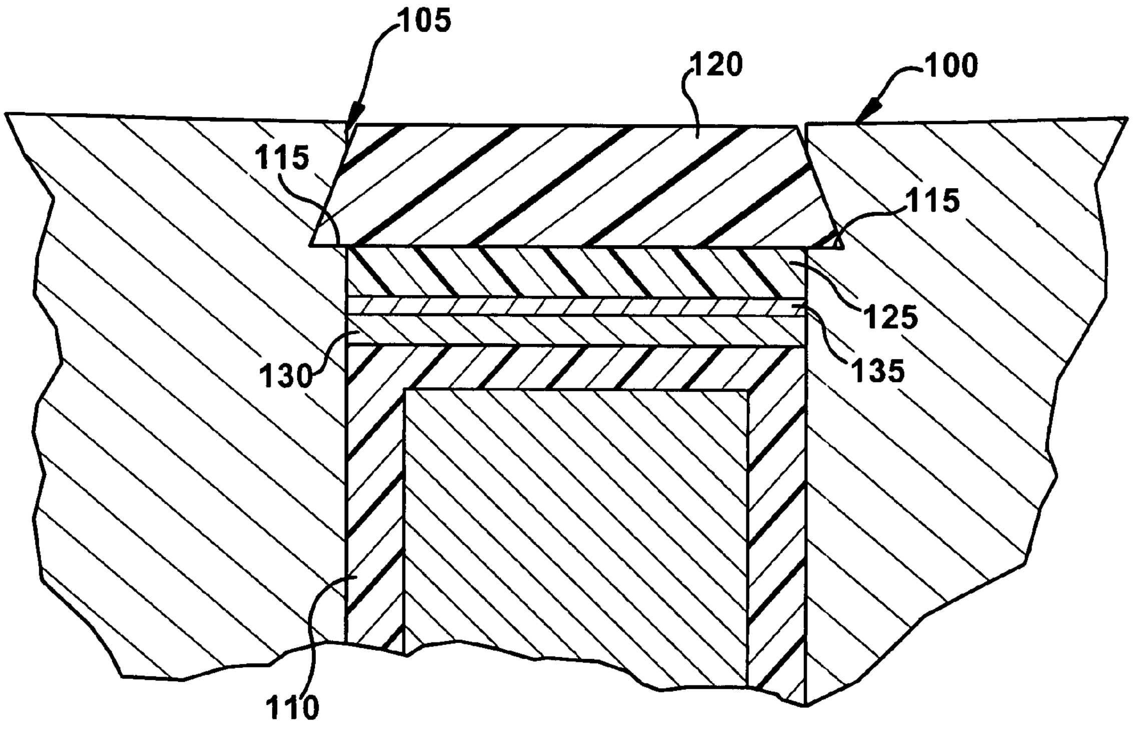
FIG. 1 is a partial, axial cross-sectional illustration of a stator core slot with a stator slide and a stator wedge in place.

Referring to FIG. 1, a magnetic stator core for a generator is partially shown at 100. The drawing is not necessarily to scale and the individual elements are shown to illustrate the interaction between the various elements. The stator core can be formed of many laminations of a magnetic steel or iron material. Typically, laminations are arranged in groups, and each group is separated by a spacer (not shown in FIG. 1). The spacers define axially spaced gaps between groups of laminations, and these gaps permit ventilation and cooling of the stator core 100. A plurality of radially oriented stator slots 105 extend axially along the stator core, with armature windings 110 seated therein. Typically, one or two armature windings 110 are present in each slot 105, but three or more could also be present. Each slot 105 is formed adjacent its mouth with a dovetail groove or undercut 115 in opposed side walls of the slot 105, permitting several to many stator wedge 120 and stator slide 125 components to be inserted in an axial direction along the length of the slot 105. It will be understood that flat filler strips 130 and ripple springs 135 may be disposed between the windings 110 and the stator wedges 120 and stator slides 125 as shown in FIG. 1. In this regard, the individual stator wedges 120 and slides 125 are generally between about 3 and 12 inches in length, and the stator core may have a length of between about 50 and 350 inches, and a diameter of between about 3 to 12 feet. Accordingly, up to 3,000 or more stator slides 125 may need to be installed in a typical generator.

The stator wedges 120 and stator slides 125, as well as the filler strips 130, can be constructed of a woven glass fabric combined with a high temperature resin. This material has excellent mechanical strength and electrical properties at elevated temperatures. The ripple springs 135 can be constructed of a unidirectional glass fabric combined with epoxy resin. The ripple springs have a wavy or sinusoidal shape along their length. This waviness gives the ripple springs resiliency, and this resiliency helps to absorb the expansion and contraction of the armature windings 110 during the various operating cycles of a generator, while maintaining the armature windings 110 tightly constrained within the stator slot 105. Alternatively, any other suitable material can be used for the stator wedges, stator slides, filler strips and ripple springs. In other embodiments, the material may also include magnetic particles, to enhance the magnetic characteristics of the stator core.

Figure 2:
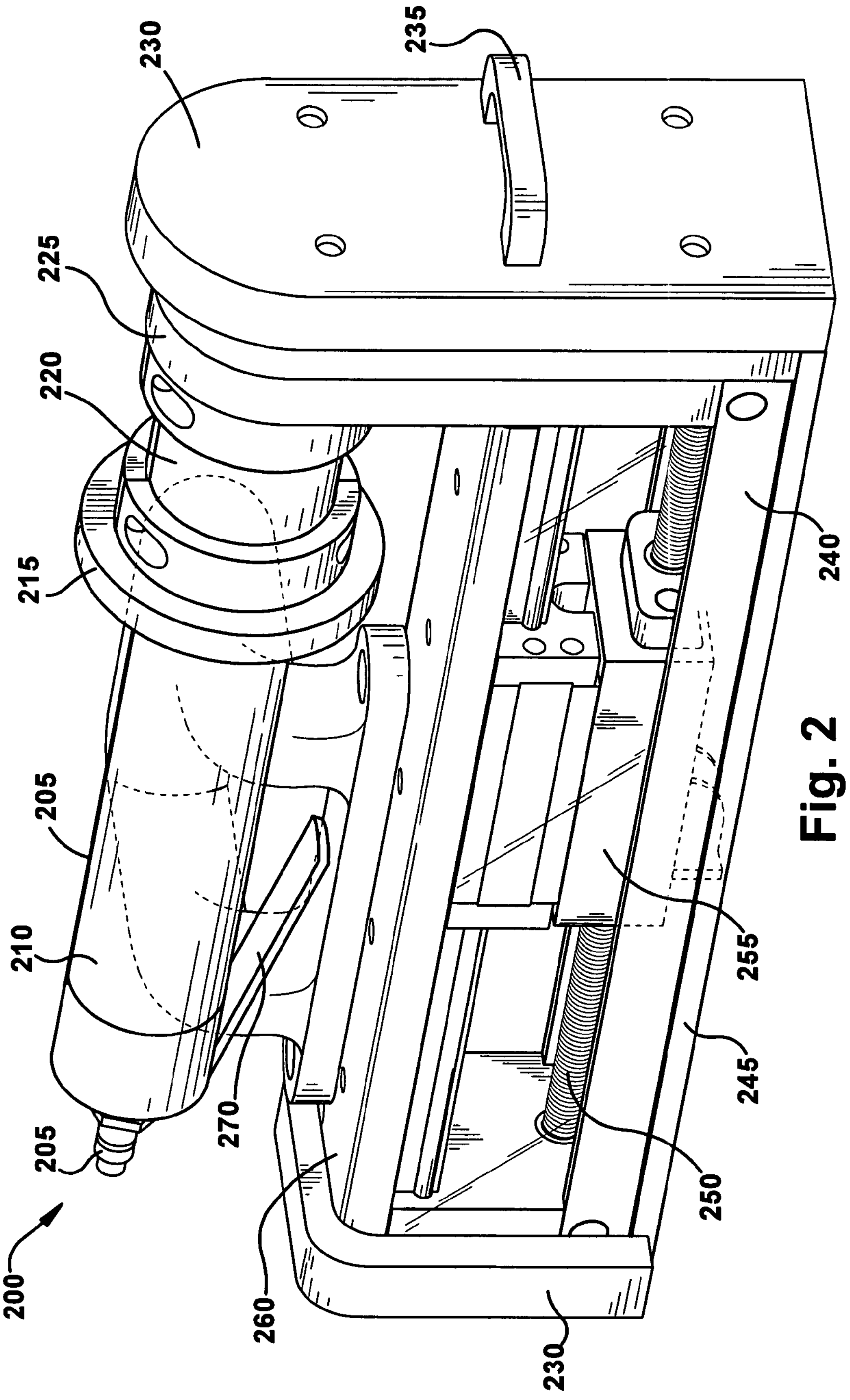
FIG. 2 is a perspective illustration of one embodiment of a tool that may be used to drive the stator slides shown in FIG. 1.
Figure 3:
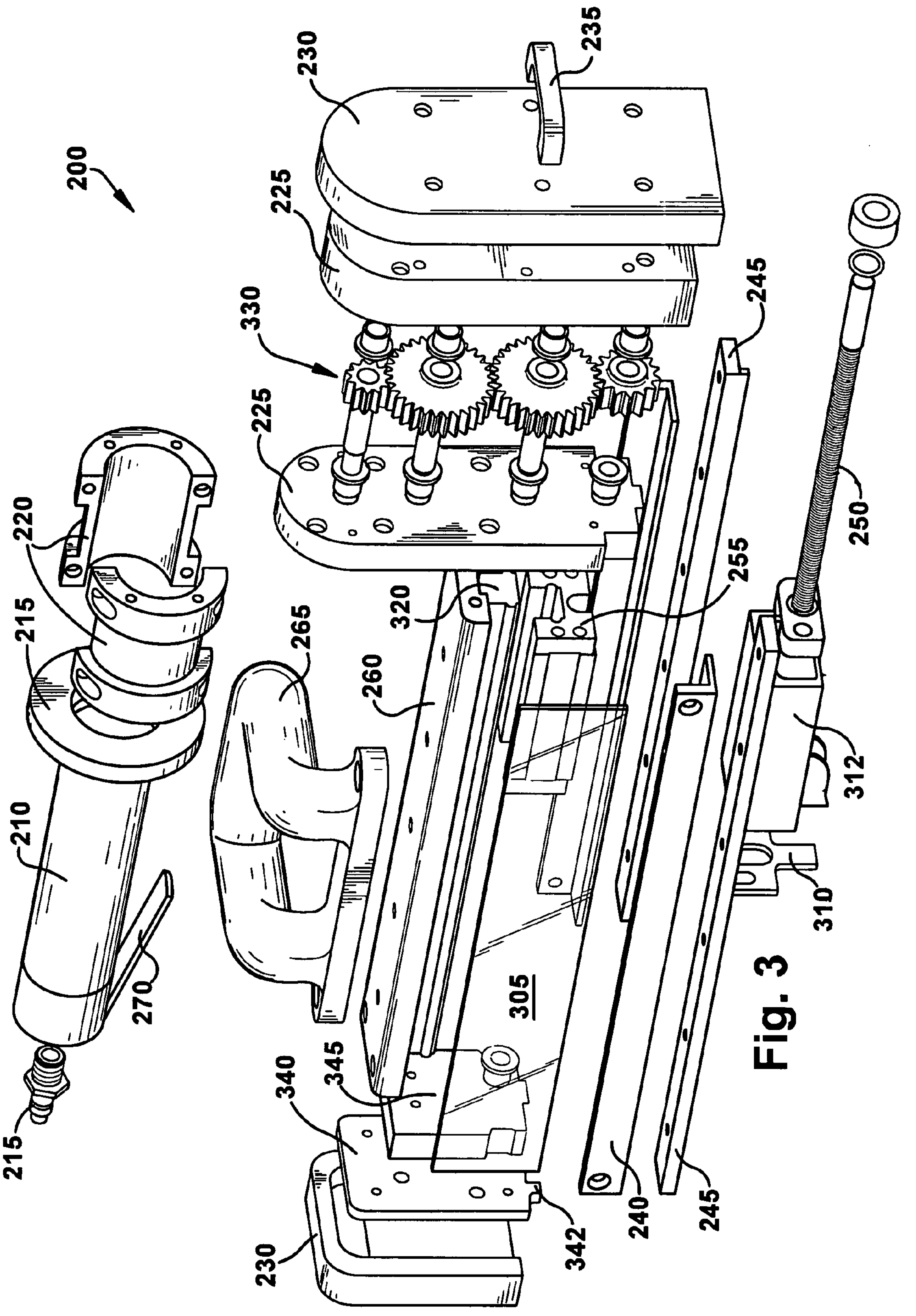
FIG. 3 is an exploded perspective illustration of one embodiment of a tool that may be used to drive the stator slides shown in FIG. 1.
Figure 4:
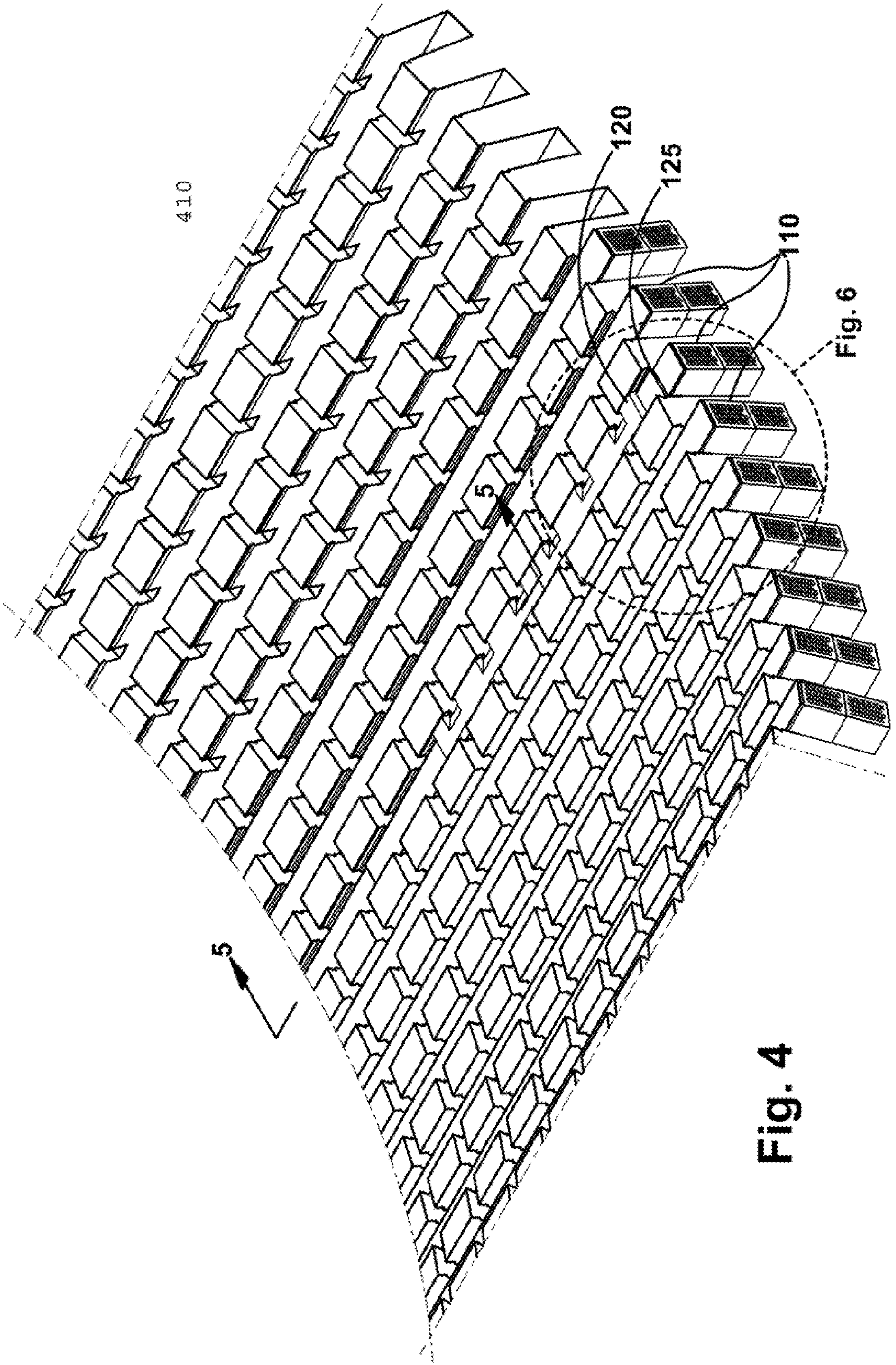
FIG. 4 is a partial, perspective illustration of a stator core.

With reference now to FIGS. 2-4, and in accordance with one embodiment of the present invention, the stator slide driving tool 200 can be a pneumatic tool. Alternatively, the tool may be powered by batteries, fuel cells, AC or DC electrical power, or any other suitable power source. The tool 200 includes an air inlet 205, a motor 210, bumper 215, clamp 220, gear housing 225, end bumpers 230, end handle 235, bottom rail 240, bottom bumper 245, screw shaft 250, driver block 255, mounting plate 260, handle 265, and an operating lever 270. A reverse button (not shown) can be present on the opposite side of motor 210. A side plate 305 (see FIG. 3) can extend from bottom rail 240 to mounting plate 260 on both sides of the tool. This side plate can be opaque or transparent, and be made from a variety of materials such as, but not limited to, aluminum, fiber composites, steel or plastic.

The bumpers 230 and 245 can be formed of a polymeric or plastic material, and function to protect the stator core during use of the tool 200. Other materials could also be used for the bumpers, as long as they are relatively soft, in comparison to the material of the stator core.

Handles 235 and 265 are used by the operator to aid in placing the tool 200 in position on the stator core, and in removing or repositioning the tool. Only one handle 235 is shown on one of the bumpers 230, however, handles could be placed on each end bumper 230, or multiple handles could be placed on one or both end bumpers. Handle 265 could also be mounted in a variety of positions and orientations on mounting plate 260. Motor 210 can also be used as a handle, with proper care not to actuate the lever 270 inadvertently.

FIG. 3 illustrates an exploded view of the tool 200, in accordance with one embodiment of the present invention. Push block tip 310, which is generally "T" shaped, is the element that makes contact with the stator slide 125. Push block 312 is connected to the driver block 255. Push block tip 310 is connected to push block 312 with removable fasteners, such as, screws or bolts. This enables push block tip 310 to be easily removed and/or exchanged with a push block tip having a different size, length, shape or configuration. In addition, elongated slots (not shown in FIG. 2) can be formed in push block tip 310. The elongated slots allow some variation in the placement of the fasteners relative to tip 310, and this enables the distance the bottom of the "T" extends below the surface of the bottom bumpers 245, to be adjusted and customized for the particular generator that is presently being serviced or manufactured.

Driver block 255 rides on a rail 320 at its upper portion, and is driven by a screw shaft 250, via push block 312, at its lower portion. Driver block 255 is securely fastened or bonded to push block 312 and any movement experienced by the push block 312 is immediately transferred to driver block 255. Screw shaft 250 is driven by motor 210 via gears 330. FIG. 3 illustrates a spur or linear gear arrangement, but any other suitable gearing arrangement could also be employed, including but not limited to, bevel, epicyclic, helical, or worm gears. A rack and pinion drive system could be used as well, and in this example the rack would take the place of the screw shaft. Gears 330 are typically manufactured from a steel or steel-alloy material, but other materials, such as, non-ferrous alloys, cast iron, iron alloys or even plastics could also be used. Gears 330 are contained within gear housing 225.

Motor 210 is preferably a pneumatic or air-powered motor, but other types of motors, capable of driving the gears 330 can also be employed. For example, motor 210 could be electrically powered via AC or DC voltage. Batteries or fuel cells could also be used to power motor 210. However, in one of the currently described embodiments of the invention, the motor is pneumatic, and is powered from a compressed air source, such as, an air compressor (not shown). Air inlet 205 is used to couple the motor 210 to an air compressor via hoses suitable for transferring compressed air.

With reference to FIG. 4, the stator core 100 has a plurality of stator slots 105, generally extending in an axial direction, which contain the armature windings 110. As one example, two armature windings 110 may be contained within each stator slot 105. The stator core is comprised of many laminations of magnetic steel or iron material. The laminations form groups, and these groups are separated by spacers. The spacers define vent gaps 410, which are generally orthogonal to the stator slots 105. The vent gaps 410 between the groups of laminations allow for ventilation and cooling of the stator core.

Figure 6:
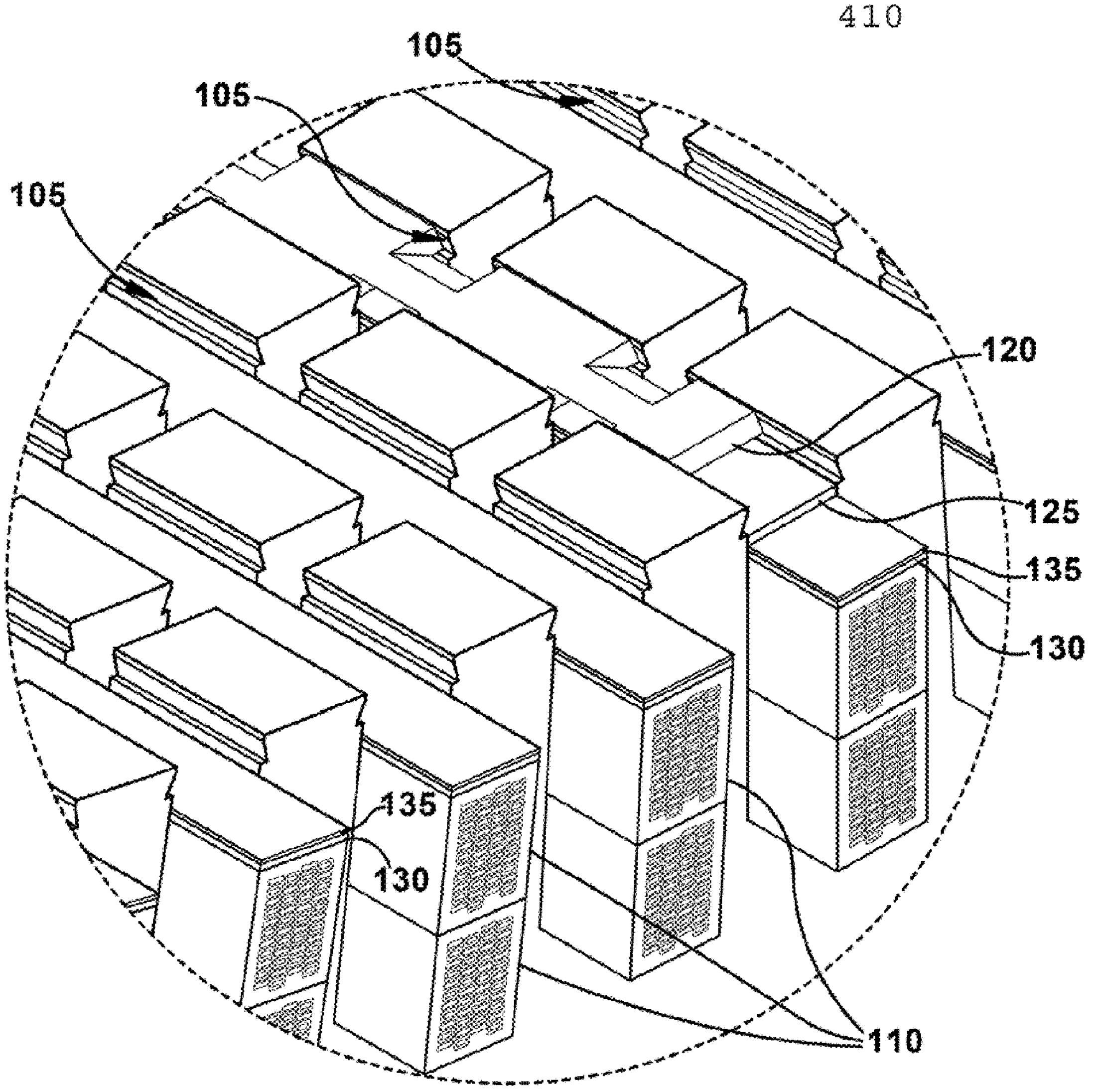
FIG. 6 is an enlarged, partial perspective illustration of a stator core, and shows the interrelation between the stator slots and the stator wedges and stator slides.

With reference to FIGS. 4 and 6, the armature windings 110 are housed in the lower portion of the stator slots 105. Various filler strips 130 and ripple springs 135 may be installed above the armature windings. A dovetail wedge 120 is inserted into dovetail groove 115 and a slide 125 is subsequently driven under the wedge 120 using tool 200.

Vent slot plate 340 (see FIG. 3) has a pair of downwardly extending projections 342. The projections 342 extend into the vent gaps 410 and leverage the strength of the core to lock the tool in place during operation. FIG. 3 illustrates a vent slot plate having two projections, but one or three or more projections could also be employed. By lock, it is to be understood that a solid point of contact is made to resist the drive force exerted while driving stator slides 125 under stator wedges 120. Vent slot plate 340 is fastened to end frame cap 345 with removable fasteners, such as screws or bolts. The vent slot plate 340 is designed to be removed an exchanged with differently sized or dimensioned vent slot plates. By enabling the vent slot plate to be interchanged, a wide variety of generators can be accommodated and serviced with tool 200. The main interchangeable items, for accommodating generators with different specifications (e.g., width of stator slot, width or length of vent gap, depth of stator slide, etc.) are bottom bumpers 245, push block tip 310 and vent slot plate 340. The size, width, length and other features of these elements can be tailored to the specific machine currently under repair, service or manufacture, so that tool 200 can be used with a wide variety of generators. Other elements of tool 200 may be interchanged as well to suit the specific requirements of various generators.

A method for installing a stator slide 125 under a stator wedge 120 will now be described with reference to FIG. 5. The armature windings 110 are first installed within stator slot 105. The filler strips 130 and ripple springs 135 may then be inserted into one or a group of stator slots 105. A stator wedge 120 is then inserted into a portion of the dovetail groove 115 in a conventional fashion. The stator wedges 120 are axially disposed within the slots 105 and dovetail grooves 115. The wedges 120 may be installed one at a time in a sequential fashion or in groups comprising multiple stator slots 105. A stator slide 125, which can have a slight taper at one end, is partially inserted under a stator wedge 120. The tool 200 is then placed over the slide 125 and the vent slot plate projections 342 are aligned with and inserted into the vent slot 410. The bottom bumpers 245, which have projections extending downwardly as well, are aligned with and extend into the stator slot 105. In this manner the tool 200 is automatically aligned in the proper manner, so that the stator slide 125 can be driven in line with the stator slot 105. The tool 200, so positioned, maintains the slide 125 in proper alignment and prevents the slide from "popping up" during the driving process. In the prior art hammering process, the slide 125 was subject to repeated "hits" and a common occurrence was that the slide 125 would start to vibrate and oscillate in a radial direction. This vibration could become pronounced and if the next blow from the hammer was miss-timed, the slide 125 could break. An advantage of tool 200 is that the slide is kept sandwiched between the tool and the ripple spring 135, so that no excessive vibration occurs, and the slide is properly aligned during the entire driving process.

Figure 5:
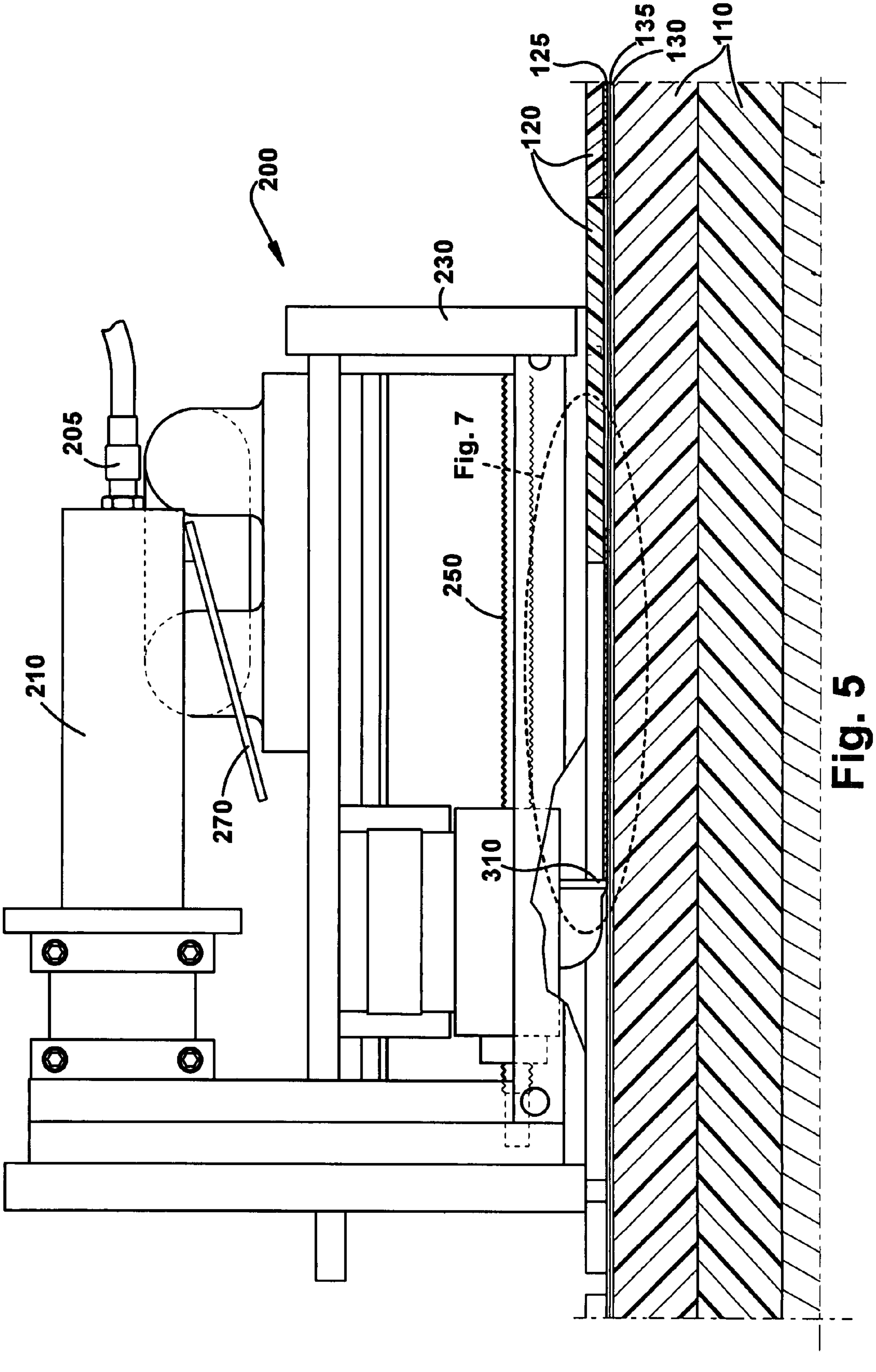
FIG. 5 is a cross-sectional illustration of one embodiment of a tool used to drive the stator slides.

The stator slide 125, now positioned partially under stator wedge 120, as shown in FIG. 5, with tool 200 directly above can be driven. The operator depresses lever 270 and causes push block tip 310 to be driven towards stator slide 125. Push block tip 310 makes contact with stator slide 125 and forces the stator slide 125 under stator wedge 120. The force exerted on stator slide 125, by push block tip 310 is a consistent and uniform force. Typically the force exerted can be around 2,200 pounds force. However, the force can be adjusted to vary between 100 to 2,500 pounds force or more by properly adjusting the compressed air source. This variability in force is very useful when using the tool on different types of generators.

As the stator slide 125 is forced under stator wedge 120, the tool 200 is supported and braced, in the axial direction, by vent slot plate projections 342, which make contact with the stator core portion in vent gap 410. The stator core is very rigid and strong, and makes an excellent point of leverage during the driving process. When the stator slide 125 is fully driven under stator wedge 120 the operator can release the lever 270, depress the reverse button (not shown) and depress lever 270 again. This withdraws the push block tip 310 from the stator slide 125 and enables the operator to remove the tool 200 and reposition it to a new location to drive the next stator slide.

Figure 7:
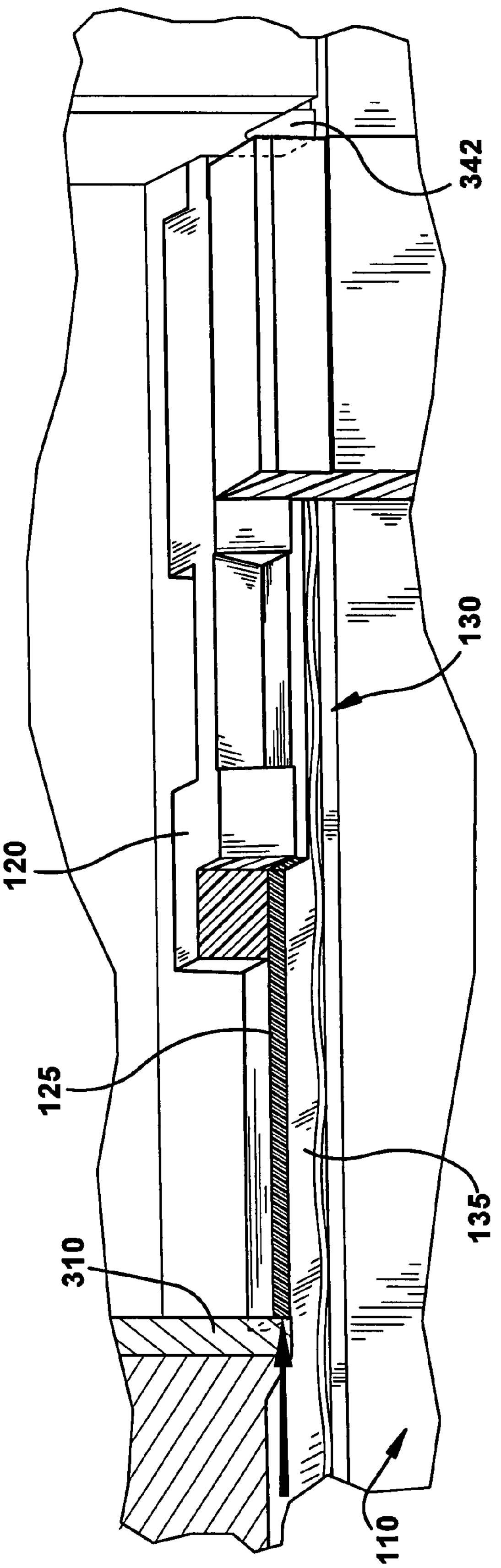
FIG. 7 is an enlarged, partial perspective illustration of the tool in place above a stator slot, showing the inter-relation between the stator wedge, stator slide, ripple spring and tool, according to one embodiment of the present invention.

FIG. 7 illustrates an enlarged, partial perspective view showing tool 200 in place above the stator wedge 120 and stator slide 125. Stator slide 125 is shown partially driven under wedge 120. Push block tip 310 is shown contacting one end of stator wedge 125. Ripple spring 135 can be seen under stator slide 125, and the ripple spring has a wavy or undulating shape. These undulations are used to give the ripple spring its "spring like" characteristics, and function to keep all elements (e.g., stator wedge 120, stator slide 125, filler strips 130 and armature windings 110) tightly constrained within stator slot 105. The ripple spring 135 also has resiliency to absorb fluctuations in armature winding dimensions caused by thermal expansion and contraction of the armature windings 110. The vent slot plate projection 342 can be seen to project down into stator slot 105. The stator core 100 is omitted from this figure for clarity, but it is to be understood that projections 342 make contact with the stator core and function to securely support tool 200 during the driving process.

While the invention has been described in connection with what is presently considered to be one of the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A tool for driving a slide under a wedge within a slot of an armature or field of a dynamoelectric machine, said tool comprising:

a frame including a pair of elongated rail members, a first end and a second end opposed to said first end;

a force application block located between said rail members, said force application block connected to a rail disposed above said force application block, said rail configured to guide said force application block in an axial direction;

a drive connected to said frame, substantially intermediate opposite ends of said frame; a lead screw threadably engaged at one end with said force application block and connected at an opposite end to said drive such that said drive rotates said lead screw when actuated, rotation of said lead screw causing axial movement of said force application block between said first end and said second end;

said armature or field comprising a core, said core comprising one or more vent slots for facilitating ventilation of said armature or field; and a slot plate for locating the tool relative to the slide, a portion of said slot plate extending into said one or more vent slots, and for establishing a reaction point for forces applied by said force application block to said stator slide.

2. The tool of claim 1 wherein said drive is pneumatically powered.

3. The tool of claim 1 wherein said slot plate is removably attached to said tool, so that said slot plate can be interchanged with differently sized slot plates.

4. The tool of claim 1 wherein said force application block is fastened to said tool in a removable manner, so that said force application block can be interchanged with force application blocks of different sizes or dimensions.

5. The tool of claim 1, wherein said elongated frame rail members are comprised of polymeric material, said polymeric material functioning to protect said core from damage during use of said tool.

6. The tool of claim 5, wherein said elongated frame rail members are removably fastened to said frame so that said elongated frame rail members may be interchanged with elongated frame rail members of different sizes or dimensions.

7. The tool of claim 1, further comprising:

a first bumper attached to said first end;

a second bumper attached to said second end;

wherein, said first bumper and said second bumper are comprised of a polymeric material.

8. A tool for driving a slide between a wedge and armature winding in a dynamoelectric machine, said dynamoelectric machine comprising an armature core and a plurality of armature winding slots, said armature core comprising one or more vent slots for facilitating ventilation of said armature core, said tool comprising:

a frame including a pair of elongated rail members, said frame having opposing frame ends disposed near the ends of said elongated rail members;

force application means located generally between said elongated rail members and said opposing frame ends, said force application means comprising a wedge driving member connected to a rail disposed in an axial direction and above said wedge driving member, said wedge driving member making contact with said slide, said force application means and said wedge driving member for applying force to said slide to drive said slide between said wedge and said armature winding;

a vent slot plate located near one of said opposing frame ends, a portion of said vent slot plate extending into said one or more vent slots, and for establishing a reaction point for forces applied by said force application means to said slide.

9. The tool of claim 8, wherein said wedge driving member is removably fastened to said force application means so that said wedge driving member may be interchanged with wedge driving members of different sizes or dimensions.

10. The tool of claim 8, wherein said vent slot plate is removably fastened to said tool so that said vent slot plate may be interchanged with vent slot plates of different sizes or dimensions.

11. The tool of claim 8, further comprising at least one bottom bumper attached near the bottom surface of said tool, said at least one bottom bumper comprised of a polymeric material and having at least one ridge, said at least one ridge extending downwardly so that said at least one ridge extends, at least partially, into at least one of said armature winding slots.

12. The tool of claim 11, wherein said at least one bottom bumper is removably fastened to said frame so that said at least one bottom bumper may be interchanged with bottom bumpers of different sizes or dimensions.

13. The tool of claim 8, further comprising a motor, said motor connected to said force application means.

14. The tool of claim 13, wherein said motor is a pneumatically powered motor.

15. The tool of claim 13, wherein said motor is connected to said force application means via at least one or more gears.

* * * * *